Oct. 31, 1961 W. W. SPOONER 3,006,080
CONVECTION TREATMENT APPARATUS
Filed Sept. 11, 1957 5 Sheets-Sheet 1
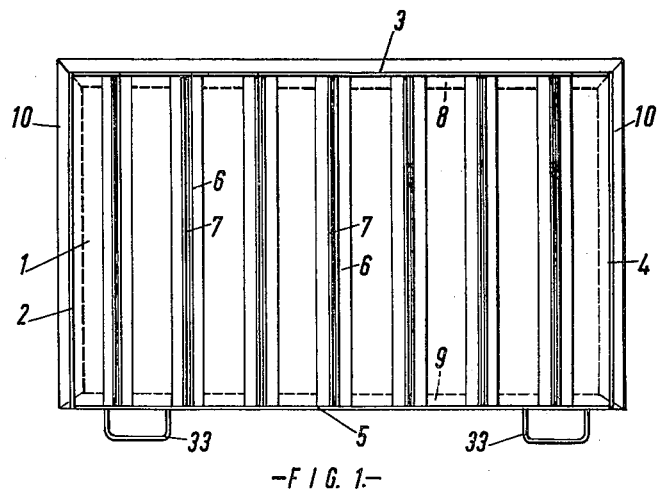
-FIG. 1.-
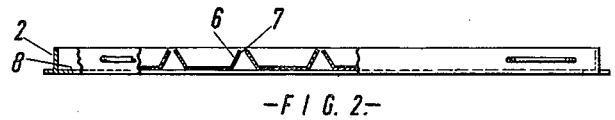
-FIG. 2.-
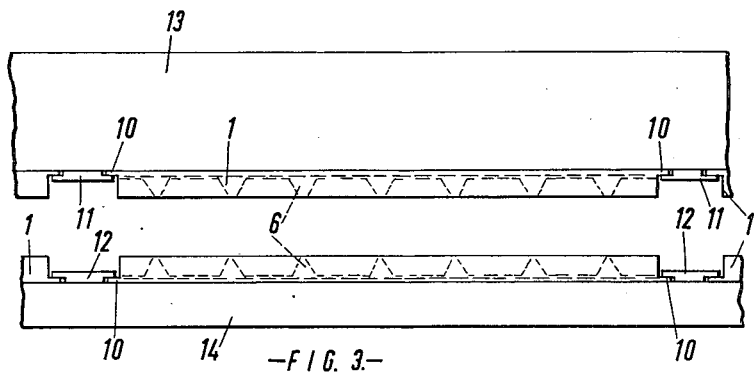
-FIG. 3.-
William Wycliffe Spooner
INVENTOR
BY Mead, Browne, Schuyler & Beveridge
ATTORNEYS

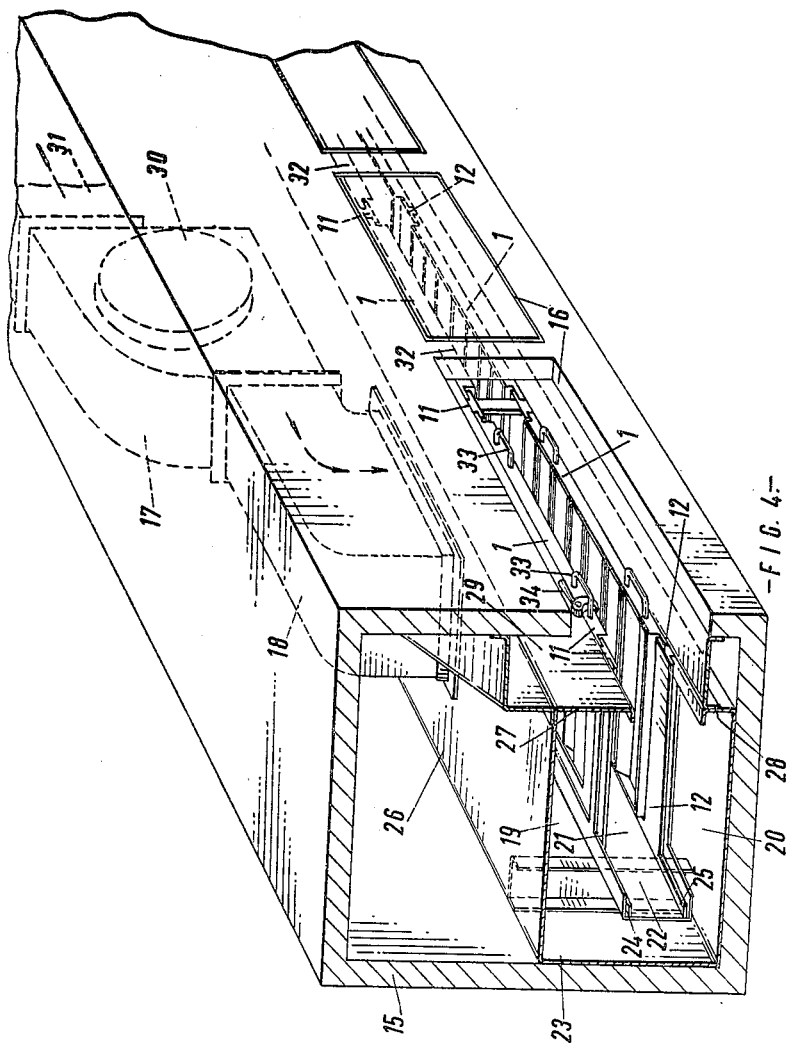

Oct. 31, 1961 W. W. SPOONER 3,006,080
CONVECTION TREATMENT APPARATUS
Filed Sept. 11, 1957 5 Sheets-Sheet 3
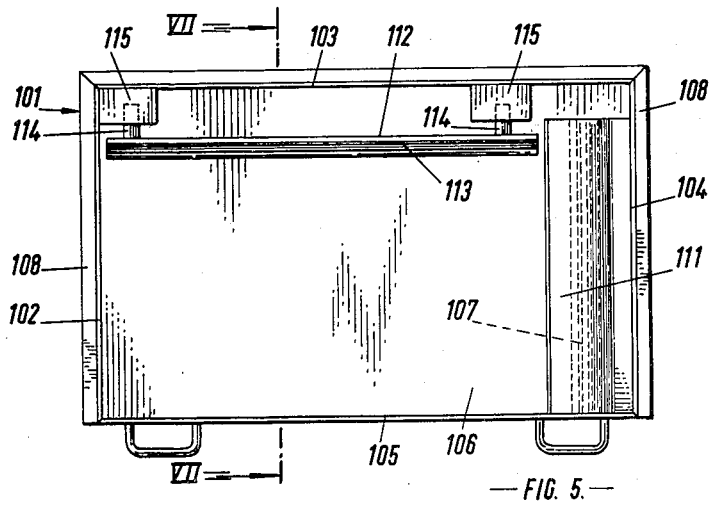
— FIG. 5. —
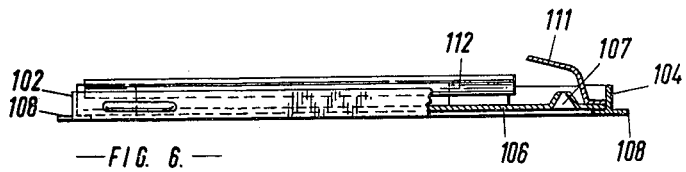
— FIG. 6. —
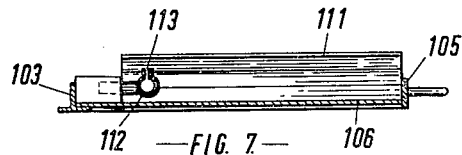
— FIG. 7. —
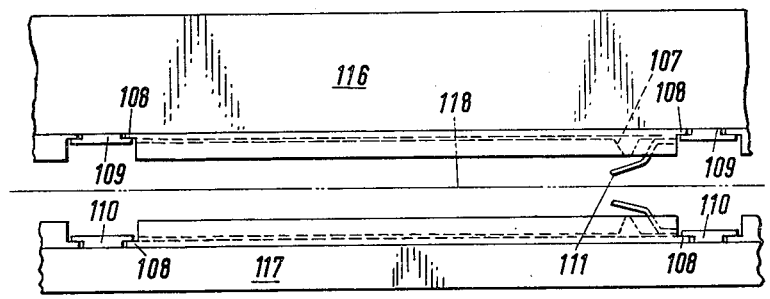
— FIG. 8. —
William Wycliffe Spooner
INVENTOR
BY Mead, Browne, Schuyler & Beveridge
ATTORNEY Oct. 31, 1961 W. W. SPOONER 3,006,080
CONVECTION TREATMENT APPARATUS
Filed Sept. 11, 1957 5 Sheets-Sheet 4
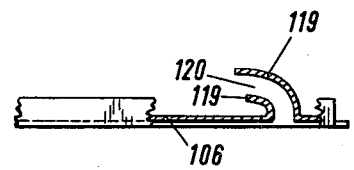
—FIG. 9.—
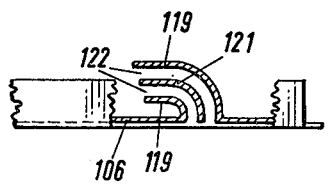
—FIG. 10.—
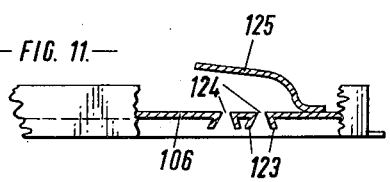
—FIG. 11.—
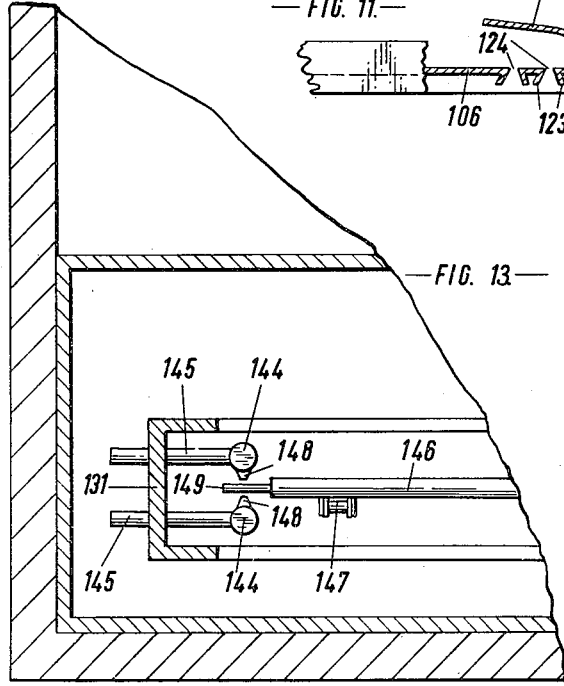
—FIG. 13.—
William Wycliffe Spooner
INVENTOR
BY Mead, Browne, Schuyler & Beveridge
ATTORNEY Oct. 31, 1961 W. W. SPOONER 3,006,080
CONVECTION TREATMENT APPARATUS
Filed Sept. 11, 1957 5 Sheets-Sheet 5
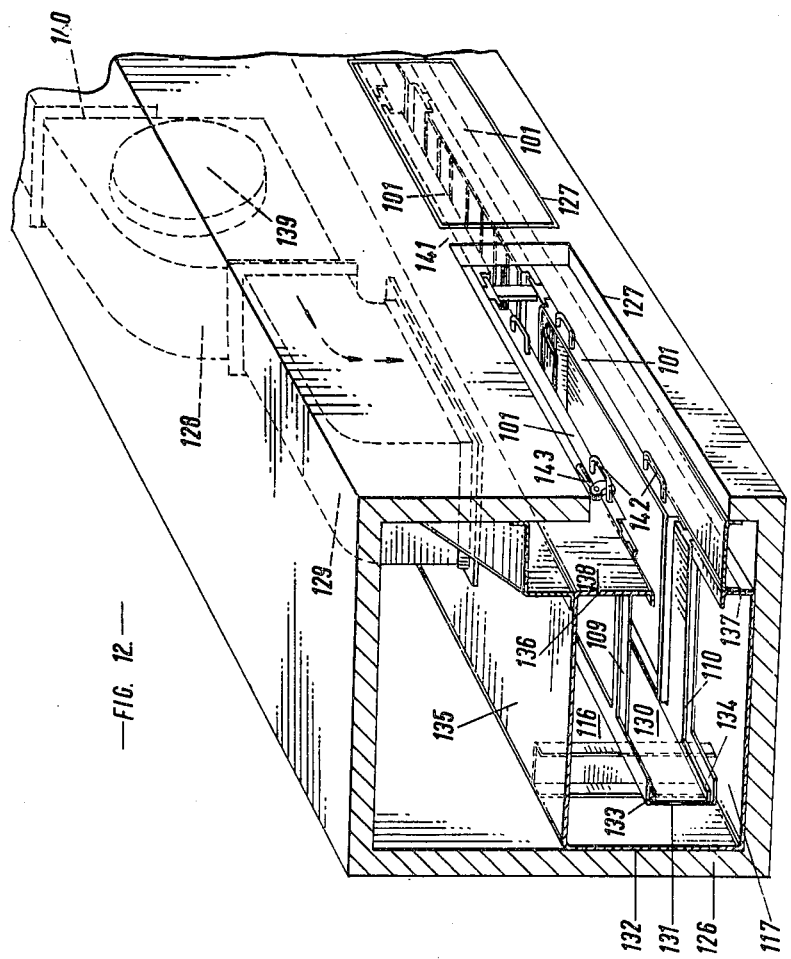
William Wycliffe Spooner
INVENTOR
BY Mead, Browne, Schuyler & Beveridge
ATTORNEY

United States Patent Office 3,006,080
Patented Oct. 31, 1961

3,006,080
CONVECTION TREATMENT APPARATUS
William Wycliffe Spooner, Ilkley, England, assignor to The Spooner Dryer & Engineering Co. Limited, Ilkley, England
Filed Sept. 11, 1957, Ser. No. 683,313
Claims priority, application Great Britain Sept. 12, 1956
8 Claims. (Cl. 34—160)

The present invention relates to convection treatment apparatus that is to say apparatus for the treatment of a material with a gaseous medium for the purpose for example of heating, drying or moistening it in the drying or conditioning of textile materials or the baking of foodstuffs in convection ovens. More particularly the invention relates to apparatus in which a gaseous medium is projected through a series of gaseous medium discharge openings or nozzles, usually slit-like nozzles.

According to the present invention the gaseous medium discharge openings or nozzles are arranged in panels each of which can be separately handled and can be readily inserted into position in the apparatus and readily withdrawn therefrom.

Each panel having discharge openings or nozzles is preferably formed as a slide engageable in slideways in the apparatus so that it can be readily withdrawn from the apparatus by sliding in the slideways and readily reinstalled therein. Thus a panel having (slit-like) openings or nozzles may be secured side by side in a frame formed with external flanges on at least two opposite sides thereof to serve as slides engageable in opposed slideways in the apparatus. For example a series of nozzles may be secured in a frame formed of T section bar with a flange at inner side of the web of the T section bar attached to the nozzles and the flange at the outer side serving as a slide. Alternatively the openings or nozzles may be pressed out from a metal sheet whose marginal edge portions can serve as flanges.

The present invention is especially applicable to convection treatment apparatus comprising opposed pressure chambers fed by a fan and having gaseous medium discharge openings or nozzles in their adjacent faces and sufficiently enclosed to enable a gaseous medium fed by the fan to circulate in an endless path to the pressure chambers through the openings or nozzles in the opposed faces thereof and back to the fan. In such an arrangement panels having openings or nozzles are detachably mounted on the faces of the pressure chambers preferably in slides extending across the pressure chambers so that the panels having openings or nozzles can be withdrawn by a transverse sliding movement. Such pressure chambers may be arranged adjacent opposite faces of a conveyor running therebetween. The pressure chambers may be interconnected at one side of the conveyor and the gaseous medium discharged by the openings or nozzles may be returned to the fan at the other side of the conveyor and the openings or nozzles arranged to be withdrawable from the other side of the conveyor through suitable doorways in the casing of the apparatus.

With apparatus of the type herein considered it is advantageous that different nozzle forms and nozzle distributions within the apparatus should be used for different types of treatment and/or for different types of material to be treated. Accordingly the present invention envisages the provision of interchangeable panels having gaseous medium discharge openings or nozzles can be selectively inserted into position in the apparatus and readily withdrawn therefrom when a different form of treatment and/or the treatment of different material is to be accomplished.

In apparatus for the treatment of a material with a gaseous medium and in which the material or objects being treated are normally conveyed through the apparatus along a linear path or a series of linear paths, the nozzles may be so formed and disposed as to direct streams of the gaseous medium substantially normally or obliquely towards the plane of conveyance.

It has been found when treating a series of individual objects, in particular during the baking of the flux on welding rods, that these objects can be advantageously treated if the gaseous medium within the apparatus flows in the general direction of the plane of movement of the articles as they are conveyed. Thus one or more group or groups of discharge openings or nozzles may conveniently be so formed as to direct a flow of gaseous medium in the general direction of the plane of movement of the conveyor.

In general the speed of movement of the conveyor through the apparatus will be so small in relation to said flow that it will be immaterial whether the conveyor and the gaseous medium move in the same or opposite directions.

Such a discharge opening or nozzle may be in the form of an opening or nozzle in a metal sheet in combination with an adjacent gaseous medium deflecting baffle: such a baffle-nozzle combination comprising a nozzle disposed transversely of the conveyor and directing the flow towards the conveyor and on to a parallel baffle acting as a deflector plate which deflects the flow in the general direction of the plane of movement of the conveyor. Thus a flow of the gaseous medium is produced adjacent each face of the conveyor and both these flows will mingle in the region of the conveyor. Preferably the several baffle nozzle combinations all produce a flow in the same direction.

The baffles and/or nozzles may be disposed on slides or assemblies which may be readily inserted into position in the apparatus and readily withdrawn therefrom. An assembly may include only one flow directing means, such as one baffle nozzle combination or may include a plurality of slit-like nozzles. This form of construction enables deflector systems to be removed from the apparatus as desired and assemblies carrying conventional slit-like nozzles directing the flow towards the conveyor to be inserted in their place and vice versa. This greatly increases the adaptability of the apparatus.

Preferably a series of assemblies carrying the deflector systems are provided adjacent each face of the conveyor and if of drawer-like form all of these assemblies are preferably withdrawable from the same side of the apparatus.

When baking materials which are poor or only moderately good thermal conductors there is a tendency for the materials to case-harden unless the time of treatment is made so large as to be relatively uneconomic. This has been found to be the case when baking the flux on some welding rods. As is well known welding rods have an exposed end portion protruding from the flux coating and it has been found advantageous to heat the flux from both radial directions, i.e. from the outside by normal methods and simultaneously from the inside via the welding rods themselves. This difficulty can be at least partly overcome by combining means for producing a flow of the gaseous medium to act upon the outer surface of the objects with at least one nozzle narrow transversely of the conveyor and relatively long lengthwise of the conveyor and adapted to direct a flow of the gaseous medium to impinge directly at a relatively high velocity upon a transversely limited area of the exposed portion of the core of each article substantially continuously during at least a portion of its passage through the apparatus.

The nozzle or nozzles which direct the flow impinging at a relatively high velocity on the exposed portion of the core may be used with great advantage in conjunction with a preceding feature of the invention, namely the use of baffles and/or nozzles which will produce a flow in the general direction of the plane of movement of the conveyor.

The flow impinging directly at high velocity on the exposed core portions is preferably directed more or less transversely to the direction of movement of the conveyor and substantially normally or obliquely towards the plane of movement thereof.

In a preferred embodiment of the invention each of a series of drawer-like assemblies disposed adjacent either face or both faces of the conveyor includes at least one baffle nozzle combination and at least one nozzle extending lengthwise of the conveyor and adapted to produce gaseous impingement upon the exposed portion of each core as it passes that assembly during its conveyance through the apparatus.

The nozzles adapted to produce impingement of the fluid directly upon the exposed portion of the core of each object may conveniently be mounted so as to be transversely displaceable relatively to the conveyor. This enables the nozzle positions to be adjusted according to the position of the exposed portions of the cores of the objects being treated. Thus when the apparatus is used for the baking of welding rods the nozzle may be adjusted transversely of the conveyor according to the length of the welding rods being treated and their transverse location upon the conveyor.

The invention is further described by way of example with reference to the accompanying drawings in which:

FIG. 1 is a plan view of one nozzle assembly according to the present invention, FIG. 2 is a corresponding side view, FIG. 3 is a diagrammatic fragmentary side view of a pair of upper and lower pressure chambers provided with nozzles as illustrated in FIGS. 1 and 2, FIG. 4 is a fragmentary perspective view partly in section of a convection treatment apparatus provided with nozzles in accordance with the present invention, FIG. 5 is a plan view of another nozzle assembly according to the invention, FIG. 6 is a corresponding front view, FIG. 7 is a sectional view along VII—VII of FIG. 5, FIG. 8 is a diagrammatic view of typical nozzle assemblies in position in an apparatus according to the present invention, FIGS. 9, 10 and 11 are fragmentary sectional views of further nozzle assemblies, FIG. 12 is a part-sectional perspective view of an apparatus of the present invention, and FIG. 13 is a cross-sectional view of a modification thereof.

FIG. 1 illustrate a nozzle assembly embodying a rectangular nozzle frame 1 of which three sides 2, 3 and 4 thereof are formed of inverted T section bar and the fourth side 5 of angle bar. Convergent nozzles 6 having slit-like discharge openings 7 are arranged side by side in the frame 1 and secured therein by attachment at their ends to the inner flanges 8, 9 of the sides 3, 5. The outer flanges 10 of the T section sides 2, 4 forming the ends of the frame serve as slides for engagement in slideways 11, 12 provided on the opposing inner faces of upper and lower pressure chambers 13, 14 diagrammatically illustrated in FIG. 3.

The treatment apparatus of FIG. 4 is enclosed within an insulated outer casing 15 formed with doorways 16 in its righthand wall and enclosing a fan 17 which, through a discharge duct 18 feeds a gaseous medium to upper and lower pressure chambers 19, 20.

The pressure chambers 19, 20 are separated by a treatment chamber 21 bounded above and below by groups of nozzles in frames 1 slidable in guideways 11, 12 as illustrated with reference to FIGS. 1, 2 and 3.

The treatment chamber 21 is bounded at its lefthand side by a flanged wall 22 which is spaced inwardly from a plate 23 on the left hand inner face of the outer casing 15 to enable gaseous medium fed to the upper pressure chamber 19 to pass to the lower pressure chamber 20 around the wall 22.

Flanges 24, 25 spaced downwardly and upwardly respectively from the flanges of the wall 22 extend from the slideways 11, 12 to provide recesses in which to receive the outer flanges of the sides 3 of the nozzle frames 1.

The upper boundary of the upper pressure chamber comprises a horizontal plate 26 which continues downwardly as a wall 27 which bounds the righthand side of the upper pressure chamber 19. The lower pressure chamber 20 is bounded at its righthand side by a wall 28 in line with the wall 27. The space 29 between the wall 27 and the righthand outer wall of the casing 15 communicates with the righthand side of the treatment chamber 21 and serves as a return passage for the flow of the gaseous medium from the treatment chamber 21 back to the intake 30 of the fan 17.

The fan 17 has a second discharge duct 31 leading to a second pair of upper and lower pressure chambers similar to the pressure chambers 19, 20.

The slideways 11, 12 are arranged transversely in line with the solid portions 32 of the outer casing 15 between the doorways 16 so that the nozzle frames 1, each with its group of nozzles, can be readily withdrawn from the apparatus by transversely sliding them from the slideways 11 with the aid of handles 33 secured to the angle section bars 5.

Releasable catches 34 are pivoted to the wall 27 to hold the nozzle frames in position.

FIGS. 5 to 7 illustrate a nozzle assembly embodying a rectangular nozzle frame 101 of which three sides 102, 103 and 104 thereof are formed of inverted T section bar and the fourth side 105 of angle bar. A nozzle plate 106 defines an upwardly convergent nozzle having a slit-like nozzle opening 107 and is arranged in the frame 101 and secured thereto by attachment at its peripheral margin to the inner flanges of the sides of the frame 101. The outer flanges 108 of the T section side 102, 104 forming the ends of the frame 101 serve as slides for engagement in slideways 109, 110, which are embodied in the apparatus of FIG. 8. This apparatus will be more fully described in due course.

A baffle or deflector plate 111 is co-extensive with and is turned over the parallel nozzle opening 107 and is so formed as to deflect a gaseous medium issuing from the nozzle in the longitudinal direction of the apparatus, i.e. in the general direction of the plane of movement of a conveyor conveying articles being treated through the apparatus.

Adjacent the rear of the nozzle assembly a nozzle tube 112 is supported on the nozzle plate 106. The nozzle tube defines a slit-like nozzle opening 113 and is supported by supply tubes 114 through which the gaseous medium can be supplied to the nozzle tube 112. The tubes 114 are slidably mounted in boxes 115 which are attached to the upper surface of and communicate with the underside of the nozzle plate 106. The nozzle 113 is designed to produce a localised relatively high velocity jet of the gaseous medium which is narrow in the transverse direction of the conveyor and relatively long in the longitudinal direction of the conveyor. When the apparatus is used to treat objects, such as welding rods, which comprise a material of relatively poor thermal conductivity on a core of relatively high conductivity and having an exposed end portion the nozzle 113 will direct a flow of the gaseous medium which will impinge directly at a relatively high velocity upon the exposed portion of the core of each article as it passes through the apparatus on the conveyor.

The slidability of the tubes 114 in the boxes 115 enables the position of the nozzle transversely of the conveyor to be adjusted to suit the objects being treated.

Referring to FIG. 8 the slideways 109, 110 are respectively mounted on upper and lower pressure chambers 116 and 117. These pressure chambers are open between the slideways and are supplied with gaseous medium under pressure by means described later in more detail in connection with FIG. 12. The conveyor on which articles to be treated are conveyed through the apparatus travels between the upper and lower pressure chambers along the path shown by a chain-dotted line 118 in FIG. 8.

The nozzle assemblies can be slid into the apparatus in a drawer-like manner, being supported by their flanges 108 as previously described. The nozzle assemblies may thus be readily withdrawn either for cleaning or for replacing the nozzle assembly in use by one embodying a different nozzle form and/or distribution.

In the nozzle assembly of FIG. 9 the nozzle plate 106 carries two generally upwardly inclined parallel vanes 119 which between them define a nozzle opening 120. The vanes 119 are so formed and disposed that when they are in use in the apparatus they will direct a stream of the gaseous fluid in the general direction of the plane of movement of the conveyor.

The nozzle assembly of FIG. 10 is similar to that of FIG. 9 with the addition of a further baffle 121 intermediate the two baffles 119. This produces two adjacent parallel slit-like nozzle openings 122 and results in a more even flow distribution.

FIG. 11 shows a still further form of nozzle assembly in which the nozzle plate 106 carries on its lower surface two parallel spaced pairs of nozzle plates such as 123. The nozzle plates of each pair are upwardly convergent and define two parallel nozzle slits 124 at the upper surface of the plate 106. When the nozzle assembly is in position in the apparatus nozzle slits 124 are disposed transversely of the conveyor. A baffle 125, which corresponds in function to the baffle 111 of FIGS. 5 to 7, is associated with the nozzle openings 124.

FIG. 12 illustrates in greater detail apparatus similar to that shown more diagrammatically in FIG. 8. The apparatus is enclosed within an insulated outer casing 126 formed with doorways 127 in its righthand wall and enclosing a fan 128 which, through a discharge duct 129, feeds the gaseous medium to upper and lower pressure chambers 116 and 117.

The pressure chambers 116 and 117 are separated by a treatment chamber 130 bounded above and below by nozzle assemblies mounted in frames 101 such as shown in FIGS. 4 to 7.

The treatment chamber 130 is bounded at its lefthand side by a flange wall 131 which is spaced inwardly from a plate 132 on the lefthand inner face of the outer casing 126. The inward spacing of the wall 131 enables gaseous medium fed to the upper pressure chamber 116 to pass to the lower pressure chamber 117.

Flanges 133, 134 spaced downwardly and upwardly respectively from the flanges of the wall 131 extend from the slideways 109, 110 to provide recesses in which to receive the outer flanges of the sides 103 of the nozzle frame 101.

The upper boundary of the upper pressure chamber comprises a horizontal plate 135 which continues downwardly as a wall 136 which bounds the righthand side of the pressure chamber 116. The lower pressure chamber 117 has a boundary at its righthand side by a wall 137 in line with the wall 136. The space 138 between the wall 136 and the righthand outer wall of the casing 126 communicates with the righthand side of the treatment chamber 130 and serves as a return passage for the flow of gaseous medium from the treatment chamber 130 back to the intake 139 of the fan 128.

The fan 128 has a second discharge duct 140 leading to a second pair of upper and lower pressure chambers similar to the pressure chambers 116 and 117.

The slideways 109, 110 are arranged transversely in line with the solid portions 141 of the outer casing 126 between the doorways 127 so that the nozzle assembly frames 101 can be readily withdrawn from the apparatus by transversely sliding them from the assemblies with the aid of handles 142 secured to the angle section bars 105.

Releasable catches 143 are pivoted to the wall 136 to hold the nozzle assembly frames in position.

Two different forms of nozzle assembly are shown in position in FIG. 12. The lefthand pair of nozzle assemblies are as illustrated in FIG. 8 and produce a gaseous flow longitudinally of the machine whilst the righthand pair of nozzle assemblies embody a plurality of spaced parallel nozzles. The latter nozzles are formed to direct a gaseous flow towards and transversely of the conveyor.

FIG. 13 is a diagrammatic cross-sectional view of the apparatus of FIG. 12 modified by the mounting of nozzle tubes 144 on the wall 131. The nozzle tubes 144 are mounted on supply tubes 145 which pass through and are slidably mounted in the wall 131, so that the position of the tubes 144 transversely of the conveyor may be adjusted. A portion of a welding rod 146 is shown being conveyed through the apparatus on a chain conveyor 147 to illustrate how nozzles 148 of the nozzle tubes 144 direct a flow of the gaseous medium on to the exposed portion 149 of the core of the welding rod 146. The nozzle tubes 144 are similar to and perform the same function as the nozzle tube 113 which is illustrated in FIGS. 5 to 7 as forming part of a nozzle assembly rather than being a permanent feature of the apparatus as shown in FIG. 13.

In the embodiments illustrated in FIGS. 4 and 13 the fans 17 and 128 are each illustrated as having a second discharge duct leading to a second pair of pressure chambers but this is not essential. If desired fans of appropriate capacity can be provided for individual pressure chambers or for individual pairs of pressure chambers.

I claim:

1. In apparatus for the treatment of material and articles by convection with a gaseous medium: a pressure chamber having fixed side walls and end walls and a fixed rear wall and having an open front face, means for conveying said material and articles along a path adjacent to and past said open front face, a gaseous medium discharge panel having at least one gaseous medium discharge opening in combination with a baffle member, said discharge opening extending transversely to said path of said conveying means, slideways across said open front face for receiving said panel so as to close said open front face apart from said discharge opening, a fan for delivering gaseous medium to said pressure chamber for discharge through said discharge opening generally normally towards said path of said conveying means and said baffle member being disposed in the path of gaseous medium so discharged so as to deflect said discharged gaseous medium into a direction generally along said path of said conveying means, and at least one slit like nozzle disposed with its length substantially parallel to said path of said conveying means and with its width transverse of said path, said slit-like nozzle width being small compared with the transverse extent of said discharge opening, for directing a flow of gaseous medium so as to impinge directly at a relatively high velocity on a transversely limited area of the material and articles.

2. In apparatus for the treatment of materials and articles by convection: a conveyor; opposed pressure chambers disposed with front faces thereof adjacent opposite faces of said conveyor, said pressure chambers having fixed side walls, end walls and rear walls and said front faces being open; slideways extending across said open front faces of said pressure chambers transversely of the path of said conveyor; enclosure means enclosing said pressure chambers and at least part of said conveyor; a plurality of gaseous medium discharge panels selectively receivable in said slideways, each of said panels having at least one gaseous medium discharge opening and said panels when received in said slideways substantially closing said open front faces apart from said discharge openings; ducting means at one side of said conveyor interconnecting the pressure chambers adjacent opposite faces of said conveyor for the passage of gaseous medium from one pressure chamber to another; and at least one fan for feeding gaseous medium to said pressure chambers, said enclosure means and at least one pressure chamber side wall at the other side of said conveyor defining a duct communicating with said fan for the return of gaseous medium thereto whereby to enable said gaseous medium to circulate in an endless path, said panels being selectively insertable and withdrawable along said slideways at said other side of said conveyor.

3. Apparatus according to claim 2 in which each of said panels comprises a frame formed of T section bars and a member having at least one gaseous medium discharge opening and connected to flanges at the inner sides of the webs of said T section bars, flanges at the outer side of said webs serving as slides to be received in said slideways.

4. Apparatus according to claim 2 in which each of said panels comprises a pressed sheet of metal in which there is formed at least one gaseous medium discharge opening, marginal edge portions of said sheet serving as flanges to be received in said slideways.

5. In apparatus for the treatment of materials and articles by convection: a conveyor; opposed pressure chambers disposed with front faces thereof adjacent opposite faces of said conveyor, said pressure chambers having fixed side walls, end walls and rear walls and said front faces being open; slideways extending across said open front faces of said pressure chambers transversely of the path of said conveyor; enclosure means enclosing said pressure chambers and at least part of said conveyor; a plurality of gaseous medium discharge panels selectively receivable in said slideways, at least some of said panels having at least one gaseous medium discharge opening in combination with a baffle member, said discharge opening extending transversely of said conveyor and being directed generally normally towards said conveyor and said baffle member being disposed in the path of gaseous medium directed by said discharge opening to deflect said directed gaseous medium into the general direction of the plane of movement of said conveyor, said panels when received in said slideways substantially closing said open front faces apart from said discharge openings; ducting means at one side of said conveyor interconnecting the pressure chambers adjacent opposite faces of said conveyor for the passage of gaseous medium from one pressure chamber to another; at least one fan for feeding gaseous medium to said pressure chambers, said enclosure means and at least one pressure chamber side wall at the other side of said conveyor defining a duct communicating with said fan for the return of gaseous medium thereto whereby to enable said gaseous medium to circulate in an endless path, said panels being selectively insertable and withdrawable along said slideways at said other side of said conveyor; and at least one slit-like nozzle disposed with its length substantially parallel to the plane of movement of said conveyor and with its width transverse thereto, said slit-like nozzle width being small compared with the transverse extent of said discharge opening, for directing the flow of gaseous medium so as to impinge directly at a relatively high velocity on a transversely limited area of the material and articles.

6. Apparatus according to claim 5 in which said slit-like nozzle is supported from said ducting means so as to be fed with gaseous medium therefrom.

7. Apparatus according to claim 6 in which said slit-like nozzle is supported from tubes extending into said ducting means and slidable therein enabling said slit-like nozzle to be adjustable transversely of said conveyor.

8. Apparatus according to claim 5 in which said slit-like nozzle is supported by and forms part of a gaseous medium discharge panel.

References Cited in the file of this patent

UNITED STATES PATENTS

| | | |
|---|---|---|
| Re. 23,384 | Dungler | July 3, 1951 |
| 2,007,036 | Cornell | July 2, 1935 |
| 2,060,430 | Spooner | Nov. 10, 1936 |
| 2,123,440 | Schlafman | July 12, 1938 |
| 2,141,403 | Offen | Dec. 27, 1938 |
| 2,270,155 | Willen | Jan. 13, 1942 |
| 2,385,962 | Barnett | Oct. 2, 1945 |
| 2,700,226 | Dungler | Jan. 25, 1955 |
| 2,807,892 | Gerrish | Oct. 1, 1957 |